(12) United States Patent
Hu et al.

(10) Patent No.: US 9,246,746 B2
(45) Date of Patent: Jan. 26, 2016

(54) RELIABLE SYSTEMS AND METHODS FOR NETWORK NOTIFICATIONS

(75) Inventors: Jie Hu, Santa Rosa, CA (US); Darren William Oye, Greenacres, WA (US); Joseph Heath, Post Falls, ID (US); Qing Yang, Cupertino, CA (US); Madhavi Raghavendra Joshi, San Jose, CA (US); Padma Asrani, San Jose, CA (US)

(73) Assignee: Ciena Corporation, Hanover, MD (US)

( * ) Notice: Subject to any disclaimer, the term of this patent is extended or adjusted under 35 U.S.C. 154(b) by 666 days.

(21) Appl. No.: 12/841,546

(22) Filed: Jul. 22, 2010

(65) Prior Publication Data

US 2012/0023205 A1 Jan. 26, 2012

(51) Int. Cl.
*G06F 15/177* (2006.01)
*H04L 12/24* (2006.01)
*H04L 29/14* (2006.01)

(52) U.S. Cl.
CPC ............ *H04L 41/0213* (2013.01); *H04L 69/40* (2013.01)

(58) Field of Classification Search
CPC .......................... H04L 41/0213; H04L 41/046
USPC ......................................................... 709/220
See application file for complete search history.

(56) References Cited

U.S. PATENT DOCUMENTS

| | | | | |
|---|---|---|---|---|
| 6,052,729 | A * | 4/2000 | Robinson ...................... | 709/224 |
| 6,128,656 | A | 10/2000 | Matchefts et al. | |
| 6,185,613 | B1 * | 2/2001 | Lawson et al. ................ | 709/224 |
| 6,330,600 | B1 | 12/2001 | Matchefts et al. | |
| 6,363,421 | B2 * | 3/2002 | Barker et al. ................. | 709/223 |
| 7,697,922 | B2 * | 4/2010 | McQuaide et al. ........ | 455/412.2 |
| 7,720,940 | B1 | 5/2010 | Wilsey et al. | |
| 2002/0085571 | A1 * | 7/2002 | Meandzija .................... | 370/410 |
| 2002/0152299 | A1 * | 10/2002 | Traversat et al. ............. | 709/223 |
| 2004/0064759 | A1 * | 4/2004 | McGuire et al. ................ | 714/39 |

(Continued)

FOREIGN PATENT DOCUMENTS

EP 1826945 A1 8/2007

OTHER PUBLICATIONS

Sun Microsystems, "Java Dynamic Management Kit 4.2 Tutorial", Dec. 2000, Sun Microsystem, all pages.*

(Continued)

*Primary Examiner* — Hua Fan
(74) *Attorney, Agent, or Firm* — Clements Bernard PLLC; Christopher L. Bernard; Lawrence A. Baratta, Jr.

(57) ABSTRACT

The present disclosure provides reliable systems and methods for network notifications, i.e. Simple Network Management Protocol version 2 Protocol Data Unit (SNMPv2-Trap-PDU) messages, asynchronous notifications, InformRequest-PDU messages, and the like, between network elements, element managers, and other element managers. In an exemplary embodiment, the present invention includes a network management system and method with a plurality of network elements operating a management agent communicatively coupled to an element manager which in turn is communicatively coupled to another element manager, a network management system (NMS), an operations support system (OSS), or the like. The present invention may utilize SNMPv2 and/or v3, and includes various techniques and processes ensuring reliable notifications between any of the network elements, element managers, or the like in the network management system.

17 Claims, 10 Drawing Sheets

(56) References Cited

U.S. PATENT DOCUMENTS

2009/0003336 A1    1/2009    Daines et al.
2009/0100170 A1*  4/2009    Schneider et al. ............ 709/224

OTHER PUBLICATIONS

Cisco, Configuring Simple Network Management Protocol (SNMP), Jan. 15, 2003, Cisco, all pages, http://docsis.beckitrue.com/documents/cisco/snmp.pdf.* ece.uic.edu, "SunInformRequest (Java Daynmic Management Kit 5.0 API: Class SnmpInformRequest", Jan. 4, 2005, ece.uic.edu, all pages.*

Waybackmachine, "archive for SunInformRequest (Java Daynmic Management Kit 5.0 API: Class SnmpInformRequest"), Jan. 4, 2005, waybackmachine, all pages.*

Peter Murray and Paul Stalvig; F5 White Paper; SNMP: Simplified—Mar. 2008; (c) 2008F5 Networks, Inc.

Network Working Group; Version 2 of the Protocol Operations for the Simply Network Management Protocol (SNMP)—MEMO; Copyright (c) The Internet Society (2002) All Rights Reserved.

Ciena; An Introduction to Ciena's Carrier Ethernet Service Delivery Portfolio; (c) 2009 Ciena Corporation.

* cited by examiner

RELIABLE SYSTEMS AND METHODS FOR NETWORK NOTIFICATIONS

FIELD OF THE INVENTION

The present invention relates generally to network management systems and methods. More particularly, the present invention relates to reliable systems and methods for network notifications in data communication networks such as notifications transmitted between network elements, element managers, and other element managers (i.e., network management systems, operations support systems, etc.).

BACKGROUND OF THE INVENTION

Data communication networks such as, for example, Ethernet networks include a plurality of interconnected network elements that are communicatively coupled to one or more element management systems (EMS) or network management systems (NMS). These data communication networks are evolving to support carrier-grade services. For example, such networks are being integrated within service provider's operations support systems (OSS) and the like. As such, network management of data communication networks is evolving towards carrier-grade capabilities. EMS/NMS systems associated with data communication networks may provide a variety of functions related to operations, administration, maintenance, and provisioning (OAM&P) such as receiving and managing alarms, configuring network elements, upgrading software or firmware, and the like. As described herein, reference is made to traps (e.g., Simple Network Management Protocol (SNMP) traps), and traps generally include a notification from one element in a network to another related to various events in the network. Conventionally, notifications between network elements and EMS/NMS systems are limited with respect to detection and re-alignment of the network traps/notifications. Further, similar problems exist with respect to traps/notifications between Network Managers. As the requirements evolve for data communication networks, there exists a need for reliable notification systems and methods over an unreliable transport layer (e.g., User Datagram Protocol (UDP)) ensuring receipt and correct alignment of all network management notifications, traps, and the like.

BRIEF SUMMARY OF THE INVENTION

In an exemplary embodiment, a method of reliable network notifications includes, at a first device, communicating network management to a second device; generating a notification at the first device; transmitting information to the second device with the notification; buffering subsequent notifications for the second device at the first device; receiving an acknowledgement of the information at the first device from the second device; and transmitting any buffered subsequent notifications to the second device. Optionally, each of the first device and the second device utilize either SNMP version 2 or SNMP version 3, and wherein the information includes an InformRequest-Protocol Data Unit (PDU). The method may further include waiting a predetermined time period at the first device to receive the acknowledgement of the InformRequest-PDU; and at the expiry of the predetermined time period, resending the InformRequest-PDU protocol data unit to the second device with the notification. The method may further include detecting a communication failure to the second device; buffering subsequent notifications for the second device at the first device; detecting recovery of communication with the second device; and transmitting the buffered subsequent notifications to the second device. The transmitting the buffered subsequent notifications to the second device may include transmitting an InformRequest-PDU protocol data unit to the second device with one of the buffered subsequent notification; buffering subsequent notifications for the second device at the first device; receiving an acknowledgement of the InformRequest-PDU protocol data unit at the first device from the second device; and transmitting an InformRequest-PDU protocol data unit to the second device with another one of the buffered subsequent notifications. The first device may include a network element with a simple network management protocol agent or communicatively coupled to the simple network management protocol agent and the second device may include an element manager. The notifications may be sent from the first device to the second device in order with delivery receipt guaranteed. Alternatively, the first device may include an element manager and the second device may include one of a network management system or an operation support system. The method may be implemented in a network management system including a plurality of an operation support system, a network management system, an element manager, and a plurality of managed network elements; wherein the first device may include any of the operation support system, the network management system, the element manager, and the plurality of managed network elements; and wherein the second device may include any of the operation support system, the network management system, the element manager, and the plurality of managed network elements. Alternatively, each of the first device and the second device may utilize Network Configuration Protocol (NETCONF).

In another exemplary embodiment, a method of reliable network notifications includes, at a first device, communicating network management to a second device; generating a notification at the first device; transmitting the notification from the first device to the second device with a logical identifier within the notification, wherein the logical identifier is utilized to identify any missing notifications from the first device to the second device; receiving the notification at the second device; examining the logical identifier; if no prior notifications are missing, processing the notification at the second device; and if prior notifications are missing, requesting missing notifications by the second device to the first device. The method may further include detecting a communication failure to the second device; buffering subsequent notifications for the second device at the first device; detecting recovery of communication with the second device; and transmitting the buffered subsequent notifications to the second device. Optionally, the logical identifier may include a sequence number or counter. Alternatively, the logical identifier may include a date/time stamp associated with an immediately preceding notification sent from the first device to the second device, and wherein the second device checks notifications in a database against the date/time stamp to determine if prior notifications are missing. The first device may include one of an element manager or a network element and the second device may include one of an element manager, a network management system, or an operation support system. The method may be implemented in a network management system including a plurality of an operation support system, a network management system, an element manager, and a plurality of managed network elements; wherein the first device may include any of the operation support system, the network management system, the element manager, and the plurality of managed network elements; and wherein the second device may include any of the operation support system, the network management system, the element manager, and the plurality of managed network elements.

In yet another exemplary embodiment, a network management system includes one or more managed network elements; an element manager communicatively coupled to the one or more managed network elements; and a network manager communicatively coupled to the element manager; a first reliable notification mechanism between the one or more managed network elements and the element manager ensuring delivery of each notification therebetween; and a second reliable notification mechanism between the element manager and the network manager ensuring delivery of each notification therebetween. The first reliable notification mechanism may include utilizing an InformRequest-Protocol Data Unit (PDU) and waiting for an acknowledgement prior to sending further notifications. The second reliable notification mechanism may include utilizing a SNMPv2-Trap-PDU with an associated logical identifier for a recipient to determine whether there are missing notifications. The second reliable notification mechanism may also include utilizing an InformRequest-PDU and waiting for an acknowledgement prior to sending further notifications.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention relates to reliable systems and methods for network notifications, i.e. Simple Network Management Protocol version 2 Protocol Data Unit (SNMPv2-Trap-PDU) messages, asynchronous notifications, InformRequest-PDU messages, and the like, between network elements, element managers, and other element managers. In an exemplary embodiment, the present invention includes a network management system and method with a plurality of network elements operating a management agent communicatively coupled to an element manager which in turn is communicatively coupled to another element manager, such as a network management system (NMS), an operations support system (OSS), or the like. The present invention may utilize SNMP (v1, v2, and/or v3), Network Configuration Protocol (NETCONF), and the like, and includes various techniques and processes ensuring reliable and ordered network management notifications between any of the network elements, element managers, or the like in the network management system.

Figure 1:
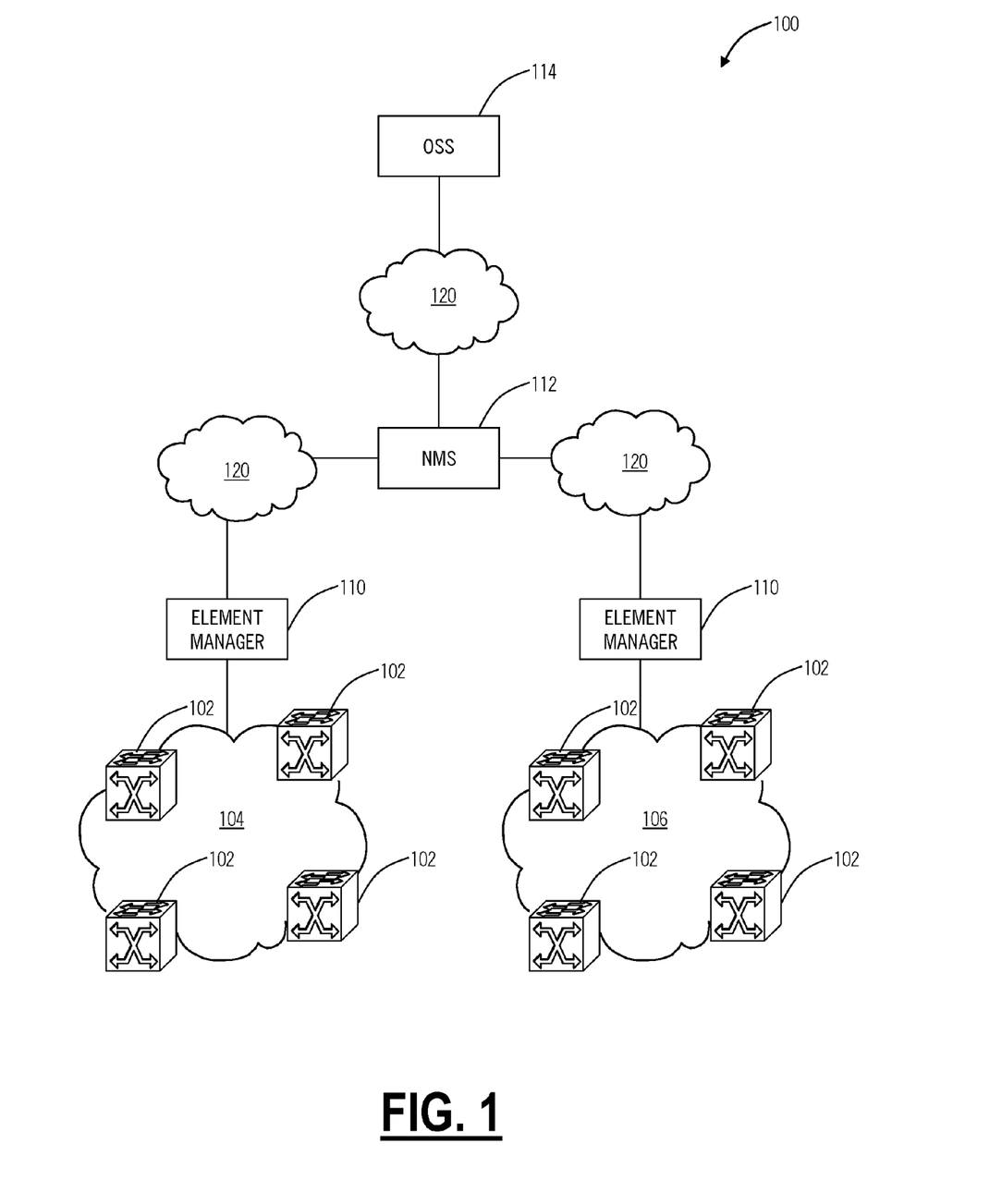
FIG. 1 is a network diagram of a network management system for a plurality of network elements according to an exemplary embodiment of the present invention.

Referring to FIG. 1, in an exemplary embodiment, a network management system 100 is illustrated managing a plurality of network elements 102. The network elements 102 may include packet switches, computers, servers, routers, optical switches, access/aggregation switches, SONET/SDH multiplexers, wavelength division multiplexed (WDM) devices, broadband remote access switches, and the like. In the example of FIG. 1, the network management system 100 is shown for illustration purposes managing two different networks 104, 106 formed from the plurality of network elements 102. The network elements 102 in each of the networks 104, 106 are interconnected by various links. Each link directly connects two of the network elements 102 together. In one exemplary embodiment, the networks 104, 106 may include Ethernet or more specifically Carrier Ethernet where the network elements 102 include Ethernet service delivery switches, service aggregation switches, optical network elements, and the like. For example, the links connecting the network elements 102 may include Gigabit Ethernet (GbE), 10 GbE, 100 GbE, and the like. Further, the GbE, 10 GbE, etc. may be transmitted over other layers such as SONET/SDH, Optical Transport Network (OTN), WDM, wireless links, and the like.

The network management system 100 includes, for example, element managers 110, a network management system (NMS) 112, and an operations support system (OSS) 114. The network management system 100 is an exemplary hierarchical management system than may be implemented by a network operator, service provider, or the like. The element managers 110 are physically connected to one or more of the network elements 102 in the networks 104, 106. Note, the elements managers 110 do not require physical connectivity to all network elements 102, but may be connected logically, i.e. communicatively coupled, to all the network elements 102 by virtue of the physical connection to some of the network elements 102 who in turn have physical connections to other network elements 102 providing the element manager logical connectivity. The element manager 110 may communicate with the network elements 102 using one or more of a variety of techniques. For example, the communication may take place via Internet Protocol (IP) packets, Simple Network Management Protocol (SNMP) messages, Extensible Markup Language (XML) messages, command-line interface (CLI) commands, Java Remote Method Invocation (RMI), NETCONF messages, or the like.

Each of the element managers 110 may be communicatively coupled to the NMS 112. In general, the NMS 112 provides higher layer network management from the element manager 110, e.g. a "manager of managers". For example, the element managers 110 may provide management of the network elements 102, e.g. Ethernet switches, and the NMS 112 may provide integration of management of the network elements 102 with other types of network elements. For example, the NMS 112 may consolidate management of Ethernet switches, WDM optical network elements, optical switches, SONET/SDH network elements, data routers, and the like. The NMS 112 may be connected via a data communication network (DCN) 120 to the element managers 110. The interface between the NMS 112 and the element managers 110 may take place via Internet Protocol (IP) packets, SNMP messages, XML messages, CLI commands, RMI, NETCONF, and the like. Further, the interface may be TMF814 compliant (TMF814 available at www.tmforum.org), Common Object Request Broker Architecture (CORBA) compliant, and the like. Note, the NMS 112 may be omitted in the network management system 100 and the element managers may communicate directly to the OSS 114 in other exemplary embodiments. As described herein, the present invention contemplates two types of reliable notifications including network element to manager and manager to manager.

The OSS 114 is typically a high level management system supporting processes such as maintaining network inventory, provisioning services, configuring network components, and managing faults across the network elements 102 as well as any other type of network element in a service provider's network. For example, the OSS 114 may integrate management of the service provider's entire network include optical, data, wireless, telephony switching, and the like. The OSS 114 may connect to the NMS 112 via the DCN 120 or alternatively directly to the element managers 110 via the DCN 120. The interface between the OSS 114 and the element managers 110 and/or the NMS 112 may take place via Internet Protocol (IP) packets, SNMP messages, XML messages, CLI commands, RMI, NETCONF, and the like. Further, the interface to the OSS 114 may include various integration standards such as TMF 513/608/814, Metro Ethernet Form (MEF) 7, ITU M.3100, Multi-Technology Operations System Interface (MTOSI), Common Object Request Broker Architecture (CORBA), and the like.

In various exemplary embodiments, the network management system 100 is configured to provide OAM&P functionality, FCAPS (Fault, Configuration, Accounting, Performance, and Security) functionality, and the like. The present invention includes various techniques, processes, systems, and methods ensuring reliable notifications between all of the elements in the network management system 100. Specifically, the present invention includes various techniques for communications between the network elements 102 and the element manager 110, between the element manager 110 and the NMS 112, and between the NMS 112 and the OSS 114.

Figure 2:
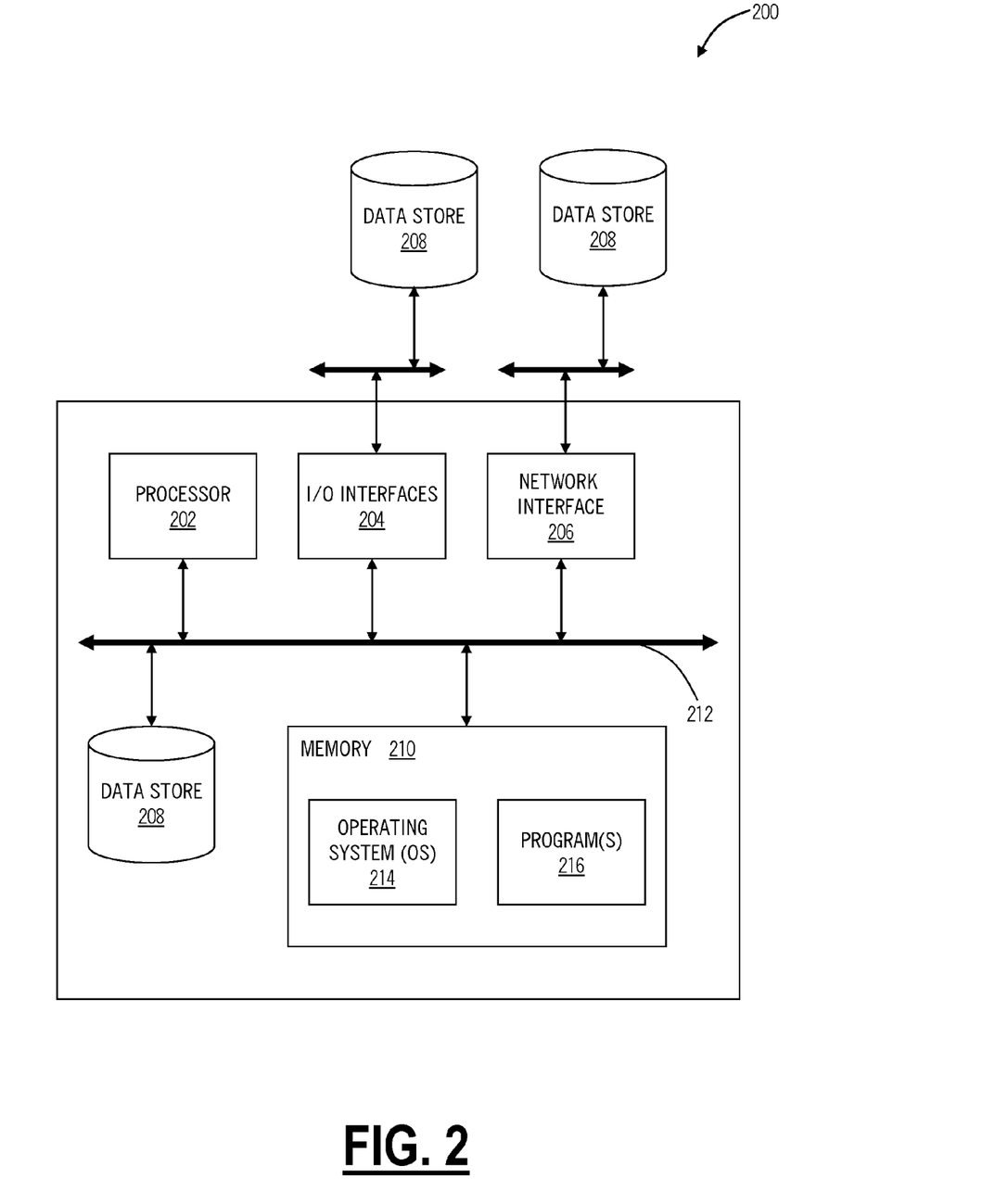
FIG. 2 is a block diagram of an exemplary implementation of a server for the network management system according to an exemplary embodiment of the present invention.

Referring to FIG. 2, in an exemplary embodiment, a block diagram illustrates a server 200 which may be utilized in an exemplary implementation of the element manager 110, NMS 112, or the OSS 114. The element manager 110, NMS 112, or the OSS 114 may be formed through one or more servers 200. For example, the element manager 110 may include a single implementation of the server 200 whereas the NMS 112 or the OSS 114 may include a plurality of the servers 200 in a server farm, data center, etc. type configuration. The server 200 may be a digital computer that, in terms of hardware architecture, generally includes a processor 202, input/output (I/O) interfaces 204, a network interface 206, a data store 208, and a memory 210. The components (202, 204, 206, 208, and 210) are communicatively coupled via a local interface 212. The local interface 212 may be, for example but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chip set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. User input may be provided via, for example, a keyboard, touch pad, and/or a mouse. System output may be provided via a display device and a printer (not shown). I/O interfaces 204 can include, for example, a serial port, a parallel port, a small computer system interface (SCSI), an infrared (IR) interface, a radio frequency (RF) interface, and/or a universal serial bus (USB) interface.

The network interface 206 may be used to enable the server 200 to communicate on a network, such as the Internet, the DCN 120, etc. For example, the server 200 can utilize the network interface 206 to communicate to/from the network elements 102, to/from the element managers 110, to/from the NMS 112, to/from the OSS 114, etc. The network interface 206 may include, for example, an Ethernet card or adapter (e.g., 10BaseT, Fast Ethernet, Gigabit Ethernet) or a wireless local area network (WLAN) card or adapter (e.g., 802.11a/b/g/n). The network interface 206 may include address, control, and/or data connections to enable appropriate communications on the network. A data store 208 may be used to store data, such as a management information base (MIB). The MIB is virtual database used for managing the entities, i.e. the network elements 102, in a communications network. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another, but can be accessed by the processor 202. The software in memory 210 may include one or more software programs, each of which includes an ordered listing of executable instructions for implementing logical functions. The software in the memory 210 includes a suitable operating system (O/S) 214 and one or more programs 206. The operating system 214 essentially controls the execution of other computer programs, such as the one or more programs 206, and provides scheduling, input-output control, file and data management, memory management, and communication control and related services. The operating system 214 may be any of Windows NT, Windows 2000, Windows XP, Windows Vista, Windows 7, Windows Server 2003/2008 (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C.), or the like. The one or more programs 216 may be configured to implement the various processes, algorithms, methods, techniques, etc. described herein with respect to the network management system 100.

Figure 3:
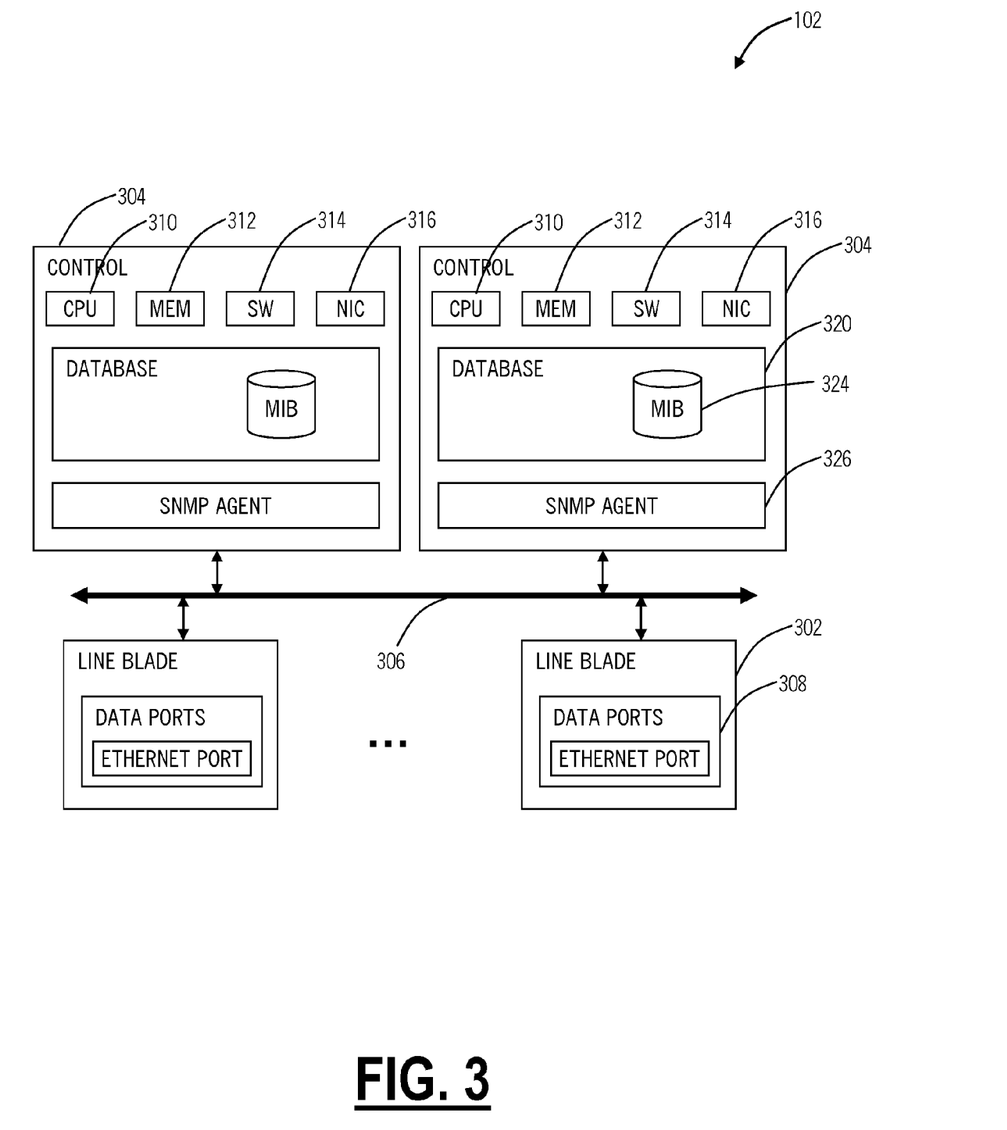
FIG. 3 is a block diagram of an exemplary implementation of a network element according to an exemplary embodiment of the present invention.

Referring to FIG. 3, in an exemplary embodiment, a block diagram illustrates an exemplary implementation of the network element 102. In this exemplary embodiment, the network element 102 is an Ethernet network switch, but those of ordinary skill in the art will recognize the present invention contemplates other types of network elements and other implementations with the network management system 100. In this exemplary embodiment, the network element 102 includes a plurality of blades 302, 304 interconnected via a backplane 306. The blades 302, 304 are also known as line cards, line modules, circuit packs, pluggable modules, etc. and refer generally to components mounted within a chassis, shelf, etc. of a data switching device, i.e. the network element 102. Each of the blades 302, 304 may include numerous electronic devices and optical devices mounted on a circuit board along with various interconnects including interfaces to the chassis, shelf, etc. Two exemplary blades are illustrated with line blades 302 and control blades 304. The line blades 302 generally include data ports 308 such as a plurality of Ethernet ports. For example, the line blade 302 may include a plurality of physical ports disposed on an exterior of the blade 302 for receiving ingress/egress connections. Additionally, the line blades 302 may include switching components to form a switching fabric via the backplane 306 between all of the data ports 308 allowing data traffic to be switched between the data ports 308 on the various line blades 302. The switching fabric is a combination of hardware, software, firmware, etc. that moves data coming into the network element 102 out by the correct port 308 to the next network element. "Switching fabric" includes switching units, or individual boxes, in a node; integrated circuits contained in the switching units; and programming that allows switching paths to be controlled.

Within the context of the network management system 100 and the present invention, the control blades 304 include a microprocessor 310, memory 312, software 314, and a network interface 316 to operate within the network management system 100. Specifically, the microprocessor 310, the memory 312, and the software 314 may collectively control, configure, provision, monitor, etc. the network element 102. The network interface 316 may be utilized to communicate with the element manager 110, the NMS 112, and/or the OSS 114. Additionally, the control blades 304 may include a database 320 that tracks and maintains provisioning, configuration, operational data and the like. The database 320 may include a management information base (MIB) 322. Further, the control blades 304 may include an SNMP Agent 324 configured to operate SNMPv2, SNMPv3, etc. or some other network management communication protocol. In this exemplary embodiment, the network element 102 includes two control blades 304 which may operate in a redundant or protected configuration such as 1:1, 1+1, etc. In general, the control blades 304 maintain dynamic system information including Layer two forwarding databases, protocol state machines, and the operational status of the ports 308 within the network element 102.

Figure 4:
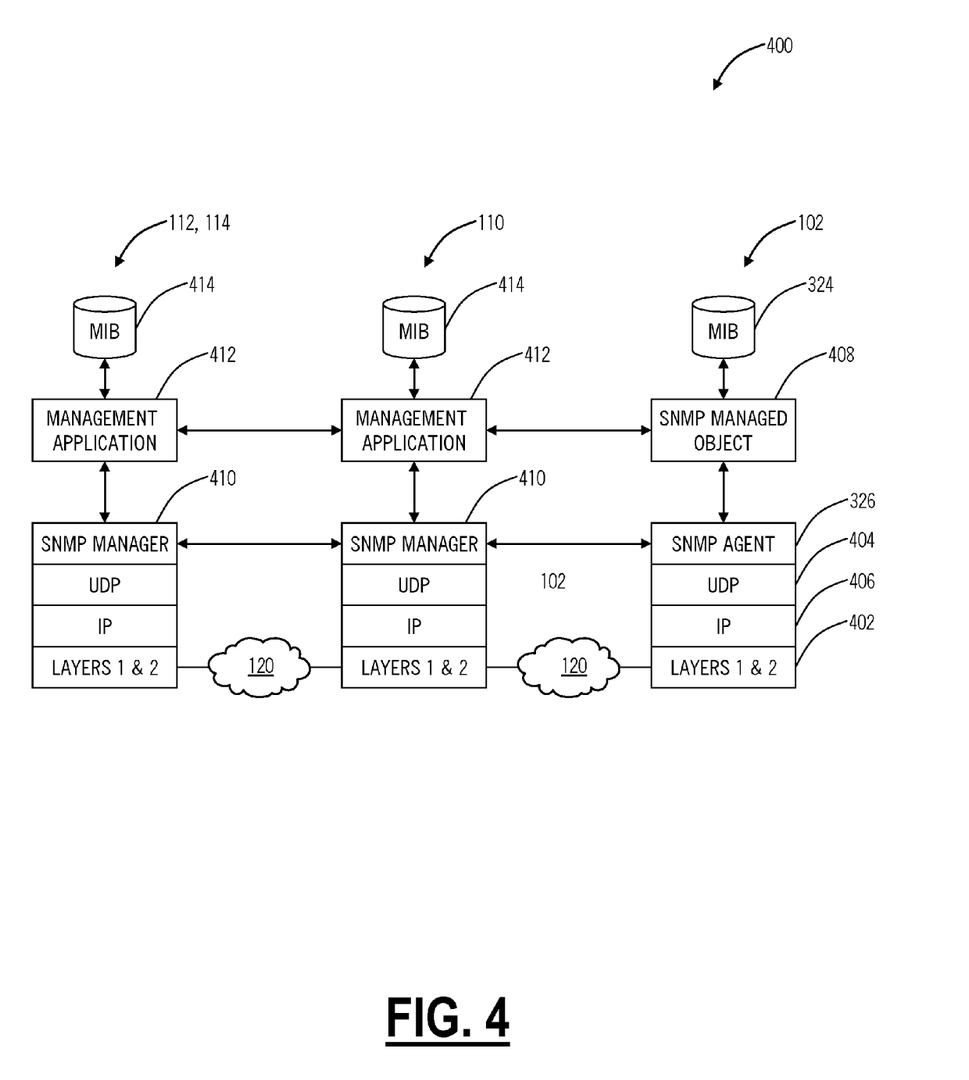
FIG. 4 is a logical diagram of communications between various elements in the network management system according to an exemplary embodiment of the present invention.

Referring to FIG. 4, in an exemplary embodiment, a diagram illustrates a logical view 400 of network management communications between various elements 102, 110, 112, 114 in the network management system 100. In various exemplary embodiments, the present invention provides systems and methods for reliable notifications between the network elements 102, the element manager 110, the NMS 112, and the OSS 114. The present invention includes various techniques and modifications within the network elements 102, the element manager 110, the NMS 112, and the OSS 114 to ensure every notification is received in an ordered manner. In an exemplary embodiment, the present invention utilizes SNMPv2 (as defined in RFC 1441-RFC 1452) and/or SNMPv3 (as defined in RFC 3411-RFC 3418) within the network management system 100. In SNMPv2 and SNMPv3, notifications may occur between agents and managers and between managers and managers. As described herein, agents may include the SNMP Agent 324 on the network element 102, and managers may include various programs 216 executed on the element manager 110, the NMS 112, and/or the OSS 114.

The network management system 100 operates physically over layers one and two 402 over the DCN 120. At the network element 102, the SNMP Agent 326 communicates via User Datagram Protocol (UDP) 404 over IP 406 through the layers one and two 402. The network element 102 is an SNMP managed object 408 that contains information in the MIB 324. Each of the element manager 110, the NMS 112, and the OSS 114 includes an SNMP Manager 410 and a management application 412 (e.g., executed programs 216). Similar to the SNMP Agent 326, the SNMP Manager 410 communicates via UDP 404 over IP 406 through the layers one and two 402. Also, the management application 412 connects to a MIB 414. The SNMP Managers 410 and the SNMP Agent 326 are communicatively coupled allowing exchange of network management data in the network management system 100.

SNMPv2 and SNMPv3 include various protocol data units (PDUs) that are information delivered as a unit among peer entities of a network and that may contain control information, address information, or data. For example, PDUs may include per RFC 1905 GetRequest-PDU, GetNextRequest-PDU, GetBulkRequest-PDU, SetRequest-PDU, Response-PDU, SNMPv2-Trap-PDU, InformRequest-PDU, and Report-PDU. Note, GetBulkRequest-PDU, InformRequest-PDU, and Report-PDU are only available in SNMPv2 and SNMPv3. Each of these PDUs has an associated message format that enables an exchange of information between the SNMP Managers 410 and the SNMP Agent or between the SNMP Managers 410 and other SNMP Managers 410. A SNMPv2-Trap-PDU is an asynchronous notification from the SNMP Agent 326 to the SNMP Manager 410. For example, a SNMPv2-Trap-PDU may includes sysUpTime, an object identifier (OID) identifying the type of trap and optional variable bindings. Of note, SNMPv2-Trap-PDU delivery is not guaranteed in SNMP (v1, v2, or v3) as traps are delivered over UDP where delivery is not assured and dropped packets are not reported. An InformRequest-PDU is an acknowledged asynchronous notification from the SNMP Manager 410 to another SNMP Manager 410. The InformRequest-PDU uses the same format as the SNMPv2-Trap-PDU. Manager-to-manager notifications are possible in SNMPv1 (using a trap), but as SNMP commonly runs over UDP where delivery is not assured and dropped packets are not reported, delivery of the trap is not guaranteed. The InformRequest-PDU may fix this by sending back an acknowledgement upon receipt. Here, the receiver may reply with a Response parroting all information in the InformRequest-PDU.

Figure 5:
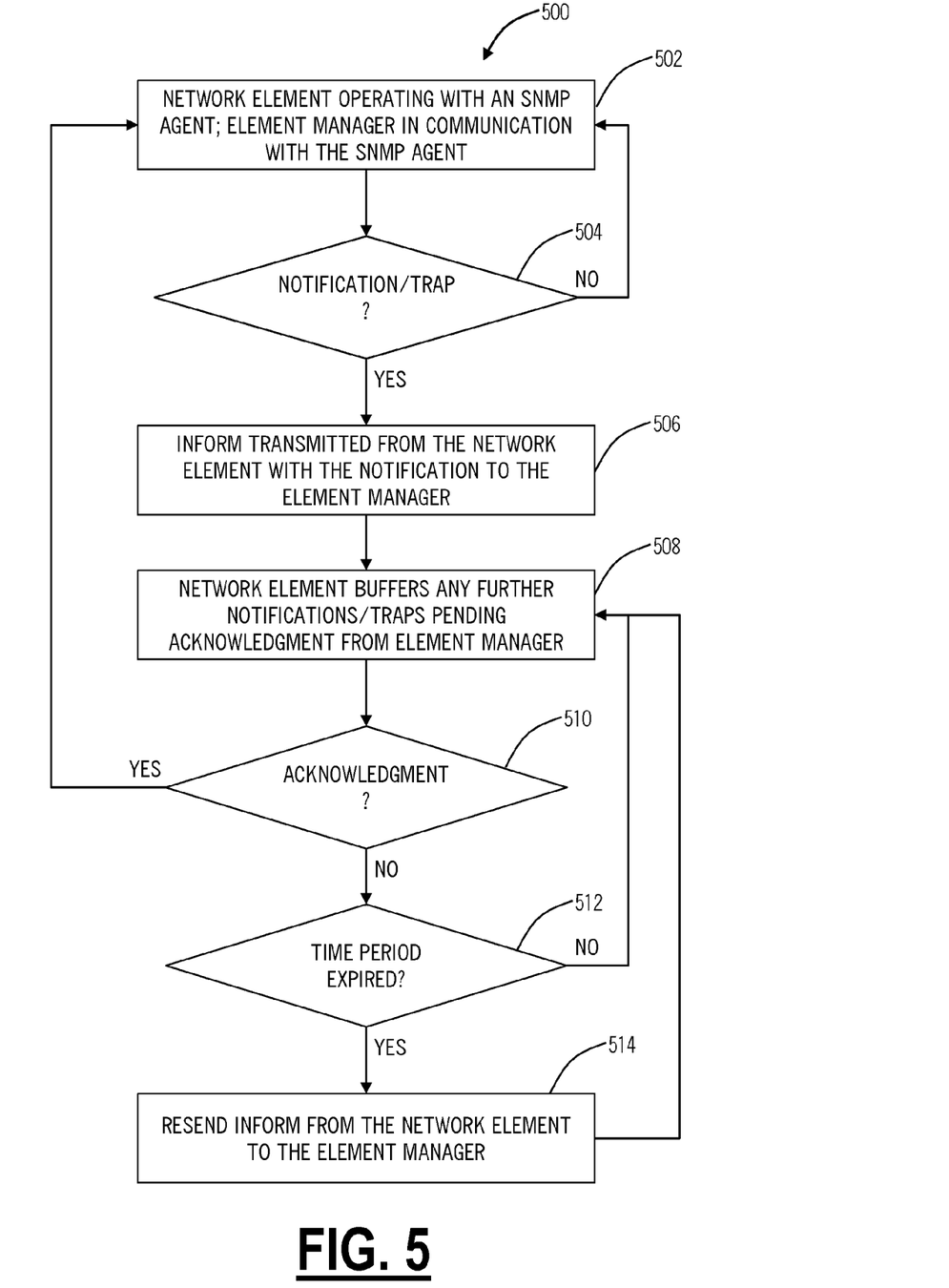
FIG. 5 is a flowchart of a reliable notification method between a network element and an element manager according to an exemplary embodiment of the present invention.

Referring to FIG. 5, in an exemplary embodiment, a flowchart illustrates a notification method 500 between a network element and an element manager. The notification method 500 illustrates notification from the network element, such as the network element 102 through the control blades 304 and the SNMP Agent 326, to the element manager, such as the element manager 110 through the programs 216 such as the management application 412. Those of ordinary skill in the art will recognize the same method 500 may be used for notifications from the element manager to the network element. Further, the notification method 500 assumes both the network element and the element manager utilize SNMPv2 or SNMPv3. To start, the network element is operating with an SNMP Agent and the element manager is in communication with the SNMP Agent (step 502). During the operation, the network element has a notification or trap that needs to be communicated to the element manager (step 504). An InformRequest-PDU is transmitted from the network element with the notification to the element manager (step 506). At this point, the network element buffers any subsequent traps or notifications pending receipt of an acknowledgment of the InformRequest-PDU from the element manager (step 508). Importantly, no further InformRequest-PDU, SNMPv2-Trap-PDU, or the like are transmitted from the network element to the element manager until acknowledgment is received. This ensures delivery of the notification while also making sure the notification is received in order, i.e. the element manager does not have to parse and reorder notifications from the network element as they are received.

After the InformRequest-PDU, the network element waits for an acknowledgment from the element manager of receipt of the InformRequest-PDU (step 510). If an acknowledgment is received, the notification method 500 returns to step 502. If no acknowledgment is received, the notification method 500 waits a predetermined time period to receive the acknowledgment (step 512). After the predetermined time period expires, the network element may resend the InformRequest-PDU to the element manager (step 514), and return to step 508. One important aspect associated with the notification method 500 is that all notifications/traps are received and acknowledged and they are received in order. Thus, the element manager does not have to sort notifications/traps. As described herein, the notification method 500 may be implemented in the network management system 100 through the network element 102 with the control blades 304 and the SNMP Agent 326 and the element manager 110 through the programs 216 such as the management application 412. Of note, each of the network element 102 and the element manager 110 utilizes one of SNMPv2 or SNMPv3 and may include software, firmware, and/or hardware to implement the various steps described herein for the notification method 500.

Figure 6:
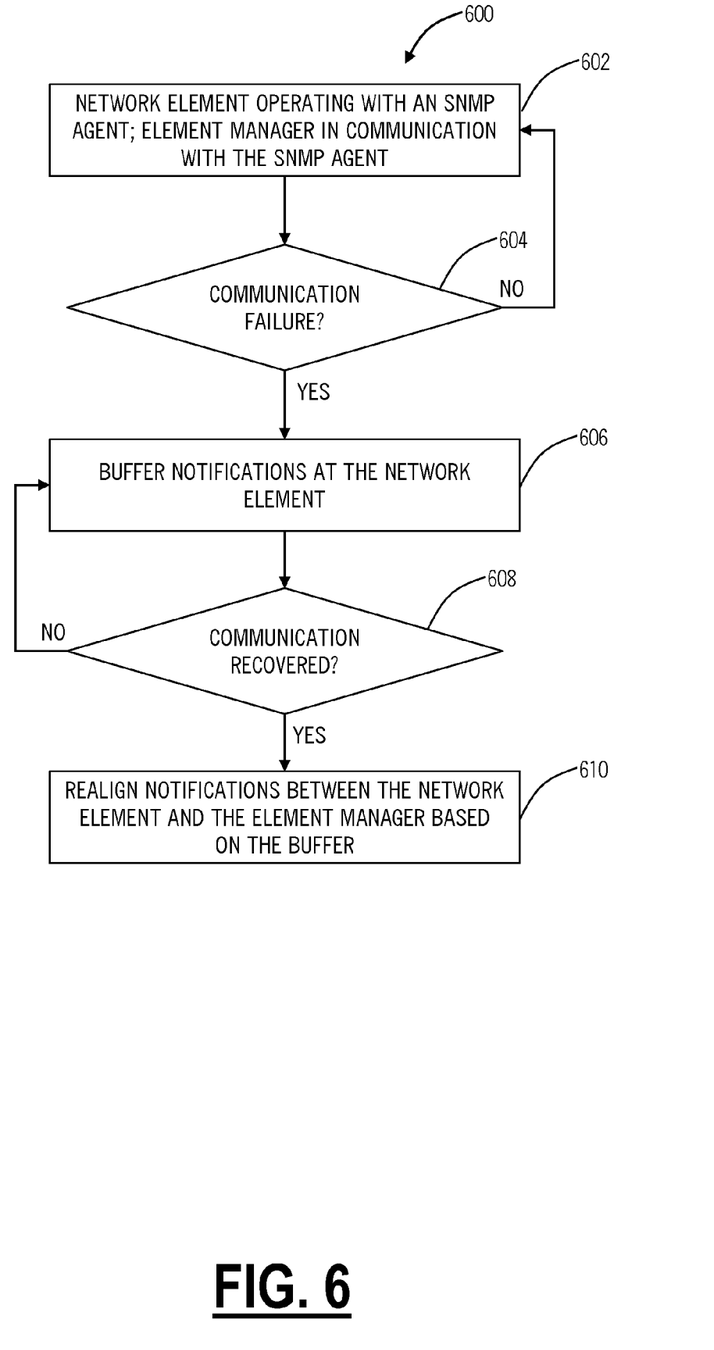
FIG. 6 is a flowchart of a recovery method between a network element and an element manager according to an exemplary embodiment of the present invention.

Referring to FIG. 6, in an exemplary embodiment, a flowchart illustrates a recovery method 600 between a network element and an element manager. The recovery method 600 may be implemented after a communication failure to recover any lost notifications/traps. Similar to the notification method 500, the recovery method 600 may be utilized from the network element, such as the network element 102 through the control blades 304 and the SNMP Agent 326, to the element manager, such as the element manager 110 through the programs 216 such as the management application 412, to provide recovery of notifications when there is communication failure. Those of ordinary skill in the art will recognize the same method 600 may be used for notifications from the element manager to the network element. The network element is operating with an SNMP Agent and the element manager is in communication with the SNMP Agent (step 602). Similar to the notification method 500, the recovery method 600 assumes both the network element and the element manager utilize SNMPv2 or SNMPv3. A communication failure may occur between the network element and the element manager (step 604). Upon the occurrence of the communication failure, the network element is configured to buffer any subsequent notifications, traps, etc. that need to be communicated to the element manager (step 606). For example, the network element may include software, firmware, and/or hardware configured to detect the communication failure and to implement the buffering. Further, the network element is configured to detect when communication is recovered to the element manager (step 608). At this point, the network element is configured to resend or realign the notifications to the element manager based upon the buffered data (step 610). Specifically, the network element may utilize the notification method 500 to communicate all of the buffered data, and the element manager may realign the received data in its database.

Figure 7:
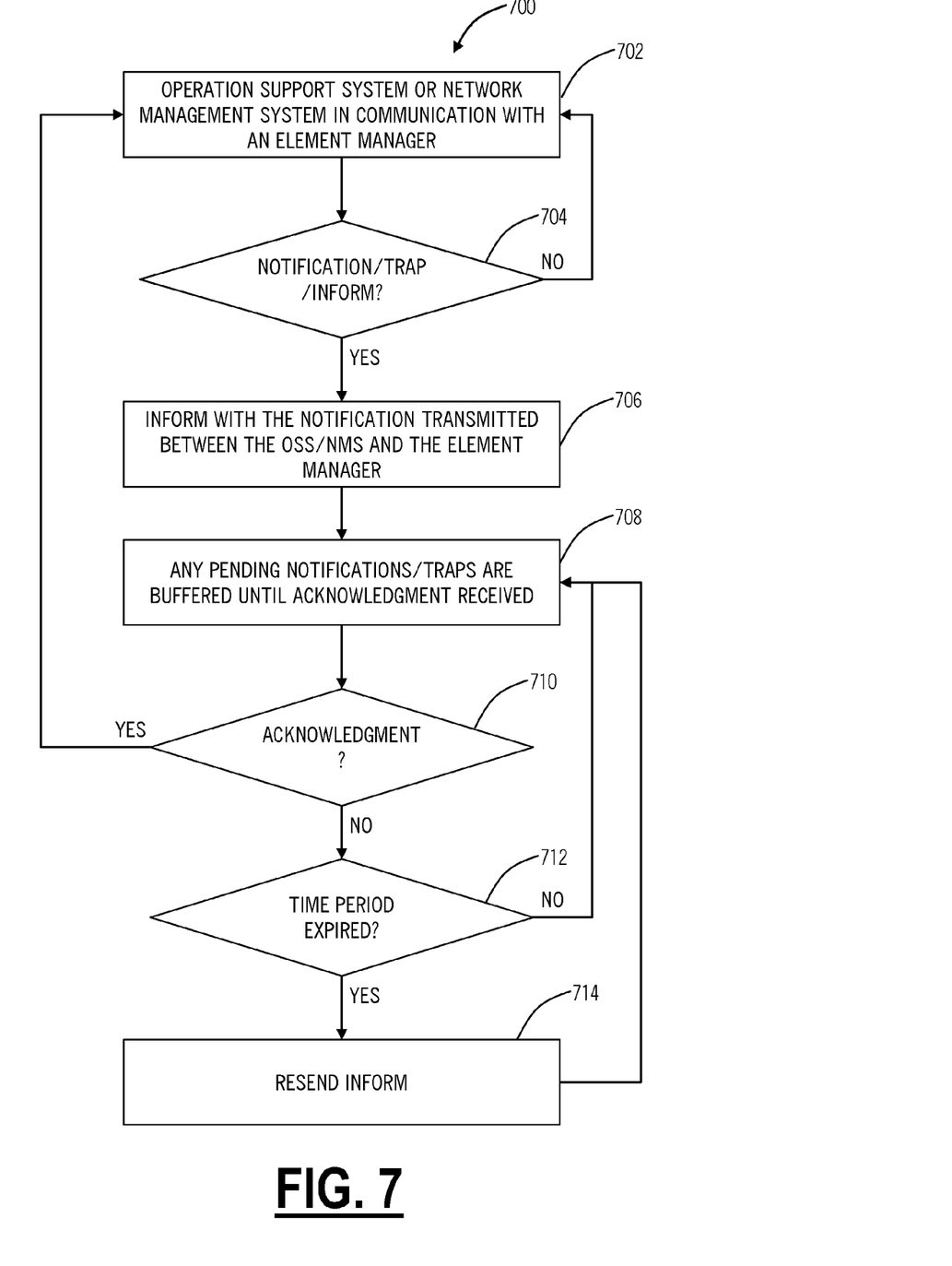
FIG. 7 is a flowchart of a reliable notification method between an OSS/NMS and an element manager according to an exemplary embodiment of the present invention.

Referring to FIG. 7, in an exemplary embodiment, a flowchart illustrates a notification method 700 between an OSS/NMS and an element manager. The notification method 700 illustrates notification from the OSS/NMS, such as the OSS 112 or the NMS 114 through the programs 216 such as the management application 412, to the element manager, such as the element manager 110 through the programs 216 such as the management application 412. Further, the notification method 700 assumes both the OSS/NMS and the element manager utilize SNMPv2 or SNMPv3. To start, the OSS/NMS with a management application is in communication with the element manager also running a management application (step 702). During the operation, the OSS/NMS has a notification or trap that needs to be communicated to the element managers or vice versa (step 704). An InformRequest-PDU is transmitted between the OSS/NMS and the element manager with the notification to the element manager (step 706). At this point, the sender, i.e. the OSS/NMS or the element manager, buffers any subsequent traps or notifications pending receipt of an acknowledgment of the InformRequest-PDU from the receiver (step 708). Importantly, no further InformRequest-PDUs, traps, or the like are transmitted until acknowledgment is received. This ensures delivery of the notification while also making sure the notification is received in order, i.e. the element manager or the OSS/NMS do not have to parse and reorder notifications as they are received.

After the InformRequest-PDU, the sender waits for an acknowledgment from the receiver of receipt of the InformRequest-PDU (step 710). If an acknowledgment is received, the notification method 700 returns to step 702. If no acknowledgment is received, the notification method 700 waits a predetermined time period to receive the acknowledgment (step 712). After the predetermined time period expires, the sender may resend the InformRequest-PDU to the receiver (step 714), and return to step 708. Similar to the notification method 500, one important aspect associated with the notification method 700 is that all notifications/traps are received and acknowledged and they are received in order. Thus, the element manager or the OSS/NMS do not have to sort notifications/traps. As described herein, the notification method 700 may be implemented in the network management system 100 through the OSS 112 or the NMS 114 through the programs 216 such as the management application 412 and the element manager 110 through the programs 216 such as the management application 412. Of note, each of OSS 112, the NMS 114, and the element manager 110 utilizes one of SNMPv2 or SNMPv3 and may include software, firmware, and/or hardware to implement the various steps described herein for the notification method 700.

Figure 8:
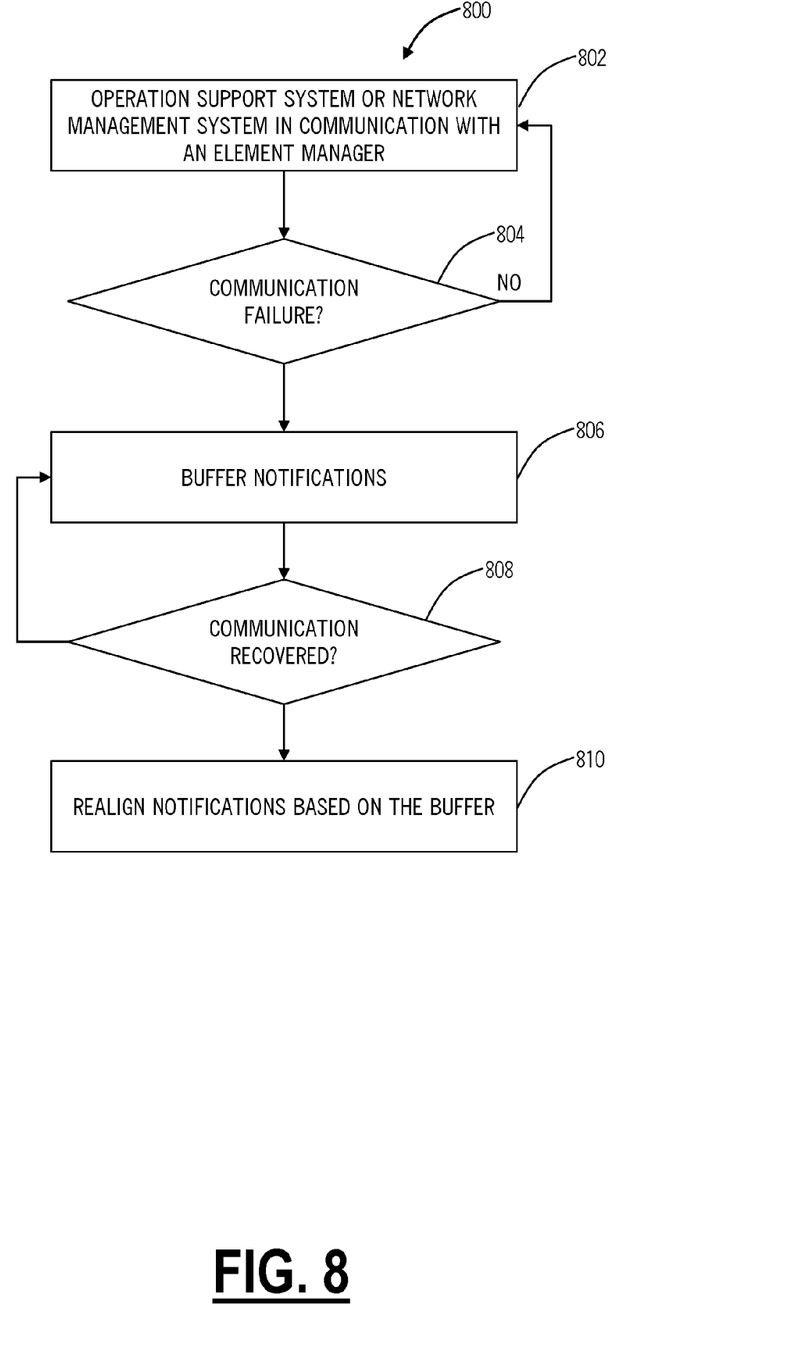
FIG. 8 is a flowchart of a recovery method between an NMS/OSS and an element manager according to an exemplary embodiment of the present invention.

Referring to FIG. 8, in an exemplary embodiment, a flow-chart illustrates a recovery method 800 between an NMS/OSS and an element manager. The recovery method 800 may be implemented after a communication failure to recover any lost notifications/traps. Similar to the notification method 700, the recovery method 800 may be utilized between the OSS/NMS, such as the OSS 112 or the NMS 114 through the programs 216 such as the management application 412, to the element manager, such as the element manager 110 through the programs 216 such as the management application 412, to provide recovery of notifications when there is communication failure. The OSS/NMS with a management application is in communication with the element manager also running a management application (step 602). Similar to the notification method 700, the recovery method 800 assumes both the network element and the element manager utilize SNMPv2 or SNMPv3. A communication failure may occur between the NMS/OSS and the element manager (step 804). Upon the occurrence of the communication failure, both the OSS/NMS and the element manager are configured to buffer any subsequent notifications, traps, etc. that need to be communicated between one another (step 806). For example, each of the element manager 110, the OSS 112, and the NMS 114 network element may include software, firmware, and/or hardware configured to detect the communication failure (e.g., over the network interface 206) and to implement the buffering (e.g., in the data store 208). Further, each of the element manager 110, the OSS 112, and the NMS 114 is configured to detect when communication is recovered (step 808). At this point, each of the each of the element manager 110, the OSS 112, and the NMS 114 is configured to resend or realign the notifications to the other based upon the buffered data (step 810). Specifically, the notification method 700 may be used to communicate all of the buffered data, and the element manager and the OSS/NMS may realign the received data in its database.

Figure 9:
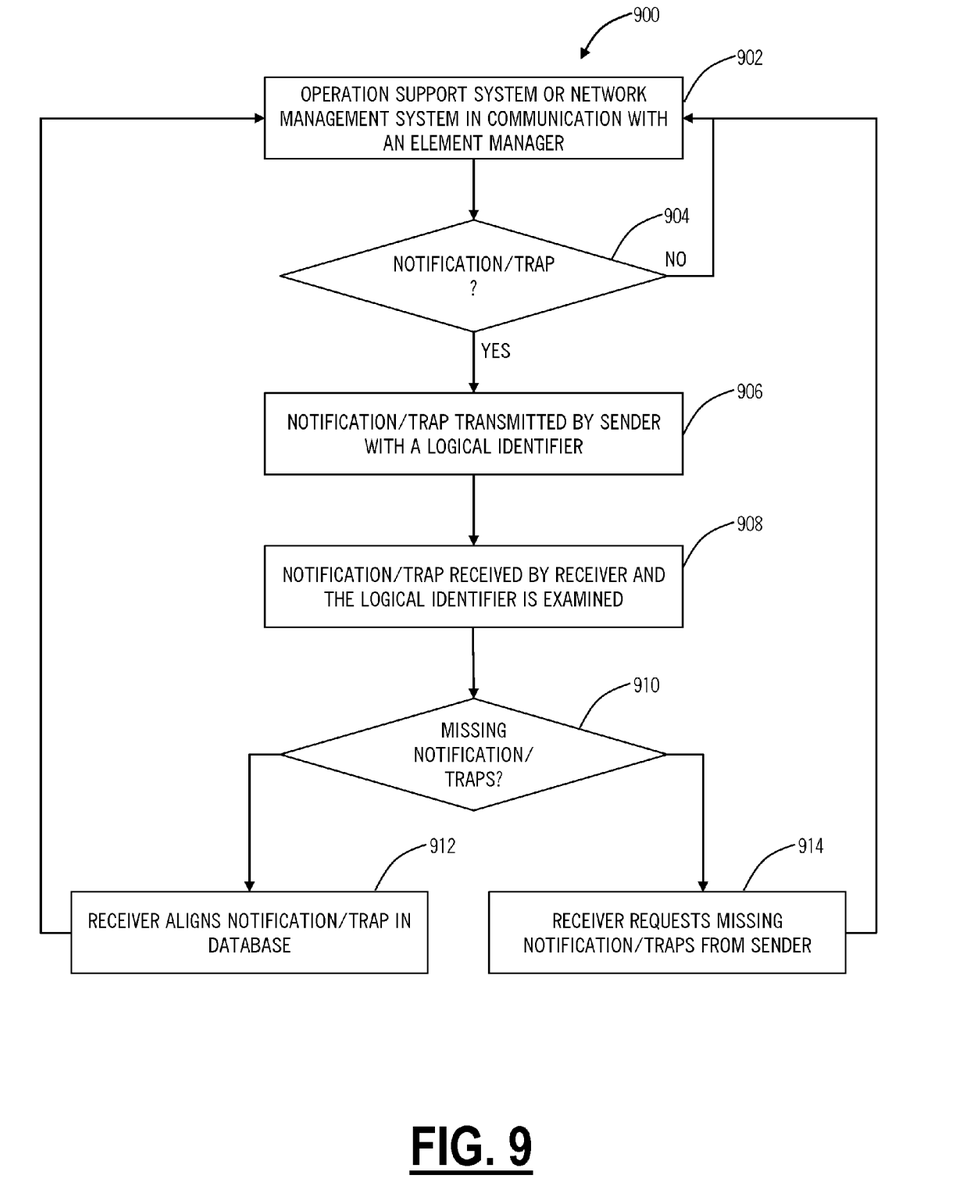
FIG. 9 is a flowchart of a notification method between an NMS/OSS and an element manager without using acknowledgments to ensure receipt of notifications according to an exemplary embodiment of the present invention.

Referring to FIG. 9, in an exemplary embodiment, a flow-chart illustrates a notification method 900 between an NMS/OSS and an element manager without using acknowledgments to ensure receipt of notifications. Of note, the notification method 700 requires each end to operate either SNMPv2 or SNMPv3. The notification method 900 provides a mechanism where one of the ends does not utilize SNMPv2 or SNMPv3, e.g. SNMPv1. Here, the InformRequest-PDU is unavailable and its associated acknowledgment of receipt. The notification method 900 illustrates notification from the OSS/NMS, such as the OSS 112 or the NMS 114 through the programs 216 such as the management application 412, to the element manager, such as the element manager 110 through the programs 216 such as the management application 412. To start, the OSS/NMS with a management application is in communication with the element manager also running a management application (step 902). During the operation, the OSS/NMS has a notification or trap that needs to be communicated to the element managers or vice versa (step 904). A SNMPv2-Trap-PDU or the like is sent by a sender (i.e., one of the NMS/OSS or the element manager) to a receiver (i.e., the other of the NMS/OSS or the element manager) with a logical identifier (step 906). The logical identifier includes any means by which the receiver can determine upon receiving a SNMPv2-Trap-PDU whether any previous SNMPv2-Trap-PDUs were missed, dropped, etc. For example, the logical identifier may include a sequence number, a checksum, a date/time stamp, a counter, some identifier from an immediately preceding SNMPv2-Trap-PDU, or the like. In one exemplary embodiment, the TRAP may include a date/time stamp from the immediately preceding SNMPv2-Trap-PDU. Here, the receiver would determine any missed SNMPv2-Trap-PDUs if the data/time stamp does not match the previously received date/time stamp in the receiver's database.

Upon receipt of the notification/trap, the receiver is configured to process the notification/trap and to examine the logical identifier (step 908). By examining the logical identifier, the receiver is able to determine if any prior notifications/traps were missed, dropped, etc. (step 910). If no prior notifications/traps were missed, then the receiver aligns the received notifications in the receiver's database (step 912). If the received detects missing notifications/traps, the receiver requests the missing notifications/traps from the sender (step 914). After both steps 912 and 914, the notification method 900 returns to step 902. Note, in the notification method 900, notifications/traps may be received out of order. As such, the receiver is configured to sort, realign, etc. received notifications/traps as required in the receiver's database. As described herein, the notification method 900 may be implemented in the network management system 100 through the OSS 112 or the NMS 114 through the programs 216 such as the management application 412 and the element manager 110 through the programs 216 such as the management application 412. Of note, each of OSS 112, the NMS 114, and the element manager 110 may include software, firmware, and/or hardware to implement the various steps described herein for the notification method 900.

Figure 10:
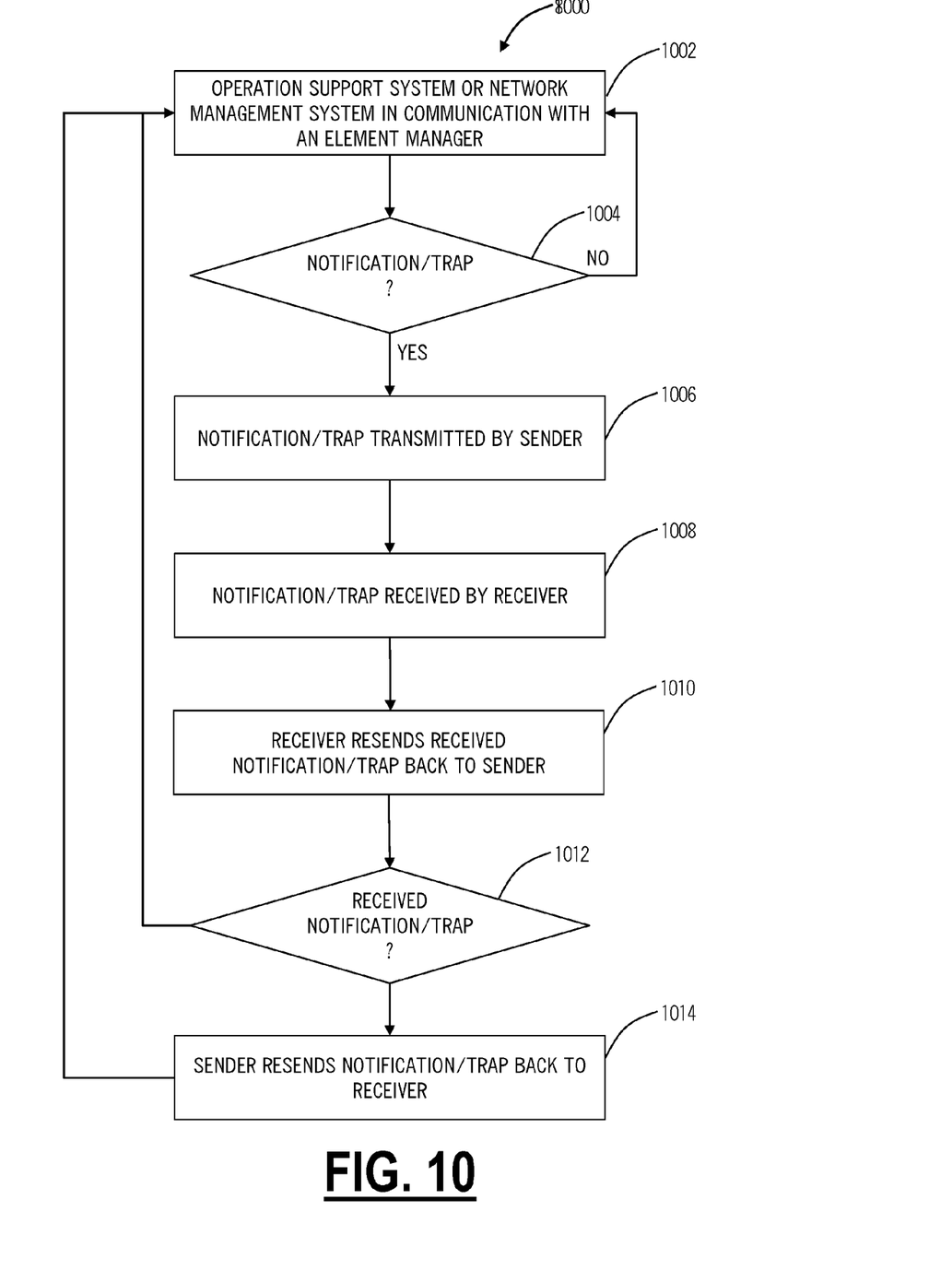
FIG. 10 is a flowchart of another notification method between an NMS/OSS and an element manager without using acknowledgments to ensure receipt of notifications according to an exemplary embodiment of the present invention.

Referring to FIG. 10, in an exemplary embodiment, a flow-chart illustrates another notification method 1000 between an NMS/OSS and an element manager without using acknowledgments to ensure receipt of notifications. Similar to the notification method 900, the notification method 1000 provides a mechanism where one of the ends does not utilize SNMPv2 or SNMPv3, e.g. SNMPv1. The notification method 1000 illustrates notification from the OSS/NMS, such as the OSS 112 or the NMS 114 through the programs 216 such as the management application 412, to the element manager, such as the element manager 110 through the programs 216 such as the management application 412. To start, the OSS/NMS with a management application is in communication with the element manager also running a management application (step 1002). During the operation, the OSS/NMS has a notification or trap that needs to be communicated to the element managers or vice versa (step 1004). A TRAP or the like is sent by a sender (i.e., one of the NMS/OSS or the element manager) to a receiver (i.e., the other of the NMS/OSS or the element manager) (step 1006).

The notification/trap is received by the receiver (step 1008). In the notification method 1000, reliable notification is accomplished without an acknowledgement by the receiver processing the notification/trap and then resending the same notification/trap back to the sender (step 1010). In this manner, the sender can be assured that a notification/trap is received. The sender checks to see if the notification/trap is received by the receiver by receiving the same notification/trap back from the receiver (step 1012). In one exemplary embodiment, the sender may buffer any subsequent notifications/traps until the sender receives the notification/trap back.

In another exemplary embodiment, the sender may continue to send subsequent notifications/traps as each notification/trap is individually verified through the receiver sending it back. If the sender does not receive the same notification/trap back from the receiver, the sender assumes the notification/trap was not received and resends it back to the receiver (step 1014). As described herein, the notification method 1000 may be implemented in the network management system 100 through the OSS 112 or the NMS 114 through the programs 216 such as the management application 412 and the element manager 110 through the programs 216 such as the management application 412. Of note, each of OSS 112, the NMS 114, and the element manager 110 may include software, firmware, and/or hardware to implement the various steps described herein for the notification method 1000.

The various methods 500, 600, 700, 800, 900, 1000 have been described herein generally with respect to SNMP. Those of ordinary skill in the art will recognize that these same methods 500, 600, 700, 800, 900, 1000 may apply with equal force to other network management protocols. For example, the network management system 100 may utilize Network Configuration Protocol (NETCONF) and "Replay" of the NETCONF notifications (RFC5277) may be used for re-alignment.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A method of providing reliable network notifications at a first device, comprising:
   generating a notification at the first device for a second device;
   transmitting the notification to a second device utilizing Simple Network Management Protocol (SNMP) and an asynchronous InformRequest-Protocol Data Unit (PDU) from the first device to the second device using User Datagram Protocol (UDP);
   buffering subsequent notifications for the second device, wherein the subsequent notifications are generated prior to an acknowledgement of receipt of the notification from the second device thereby operating in an asynchronous mode for SNMP;
   subsequent to receiving the acknowledgement of receipt of the notification from the second device within a predetermined time period, transmitting a next notification of the buffered subsequent notifications to the second device; and
   subsequent to a failure to receive the acknowledgment within the predetermined time period, resending the notification as an asynchronous InformRequest PDU while continuing the buffering of the subsequent notifications,
   wherein the notification and the subsequent notifications are received, by the second device, in an order they were generated at the first device, and
   wherein each of the first device and the second device utilize Network Configuration Protocol (NETCONF).

2. The method of claim 1, wherein each of the first device and the second device utilize either SNMP version 2 or SNMP version 3.

3. The method of claim 2, further comprising:
   waiting a predetermined time period at the first device to receive the acknowledgement of the InformRequest-PDU; and
   at the expiry of the predetermined time period, resending the InformRequest-PDU to the second device with the notification.

4. The method of claim 2, further comprising:
   detecting a communication failure to the second device;
   buffering subsequent notifications for the second device at the first device;
   detecting recovery of communication with the second device; and
   transmitting the buffered subsequent notifications to the second device.

5. The method of claim 4, wherein the transmitting the buffered subsequent notifications to the second device comprises:
   transmitting an InformRequest-PDU to the second device with one of the buffered subsequent notification;
   buffering subsequent notifications for the second device at the first device;
   receiving an acknowledgement of the InformRequest-PDU at the first device from the second device; and
   transmitting an InformRequest-PDU to the second device with another one of the buffered subsequent notifications.

6. The method of claim 2, wherein the first device comprises a network element with a simple network management protocol agent or is communicatively coupled to the simple network management protocol agent, and the second device comprises an element manager.

7. The method of claim 1, wherein notifications are sent from the first device to the second device in order with delivery receipt guaranteed.

8. The method of claim 1, wherein the first device comprises an element manager and the second device comprises one of a network management system or an operation support system.

9. The method of claim 1, wherein the method is implemented in a network management system comprising a plurality of an operation support system, a network management system, an element manager, and a plurality of managed network elements;
   wherein the first device comprises any of the operation support system, the network management system, the element manager, and the plurality of managed network elements; and
   wherein the second device comprises any of the operation support system, the network management system, the element manager, and the plurality of managed network elements.

10. A device configured to provide reliable network notifications, comprising:
    at least one port communicatively coupled to a switching fabric; and
    memory storing software that, when executed, cause a microprocessor to:
      generate a notification at the device for a second device;
      transmit the notification to the second device over the at least one port utilizing Simple Network Management Protocol (SNMP) and an asynchronous InformRequest-Protocol Data Unit (PDU) from the first device to the second device using User Datagram Protocol (UDP);
      buffer subsequent notifications for the second device in the memory, wherein the subsequent notifications are generated prior to an acknowledgement of receipt of the notification from the second device thereby operating in an asynchronous mode for SNMP subsequent to receiving the acknowledgement of receipt of the notification from the second device within a predetermined time period, transmit a next notification of the buffered subsequent notifications to the second device; and subsequent to a failure to receive the acknowledgment within the predetermined time period, resend the notification while the subsequent notifications continue to be buffered, wherein the notification and the subsequent notifications are received, by the second device, in an order they were generated at the device, and wherein each of the device and the second device utilize Network Configuration Protocol (NETCONF).

11. The device of claim 10, wherein each of the device and the second device utilize either SNMP version 2 or SNMP version 3.

12. The device of claim 10, wherein the memory storing software that, when executed, further cause the microprocessor to:

wait a predetermined time period at the first device to receive the acknowledgement of the InformRequest-PDU; and at the expiry of the predetermined time period, resend the InformRequest-PDU to the second device with the notification.

13. The device of claim 10, wherein the memory storing software that, when executed, further cause the microprocessor to:

detect a communication failure to the second device;

buffer subsequent notifications for the second device at the device;

detect recovery of communication with the second device; and transmit the buffered subsequent notifications to the second device.

14. The device of claim 13, wherein the memory storing software that, when executed, further cause the microprocessor to:

transmit an InformRequest-PDU to the second device with one of the buffered subsequent notification;

buffer subsequent notifications for the second device at the device;

receive an acknowledgement of the InformRequest-PDU at the device from the second device; and transmit an InformRequest-PDU to the second device with another one of the buffered subsequent notifications.

15. The device of claim 10, wherein the device is a network element with a simple network management protocol agent or is communicatively coupled to the simple network management protocol agent, and the second device is an element manager.

16. The device of claim 10, wherein notifications are sent from the device to the second device in order with delivery receipt guaranteed.

17. The device of claim 10, wherein the device is an element manager and the second device is one of a network management system or an operation support system.

* * * * *